Sept. 18, 1962 R. P. SMITH 3,054,641
PIVOTED SEAT BACK
Filed Jan. 14, 1960 2 Sheets-Sheet 1

RAYMOND P. SMITH
INVENTOR.

BY John R. Faulkner
John J. Roethel

ATTORNEYS

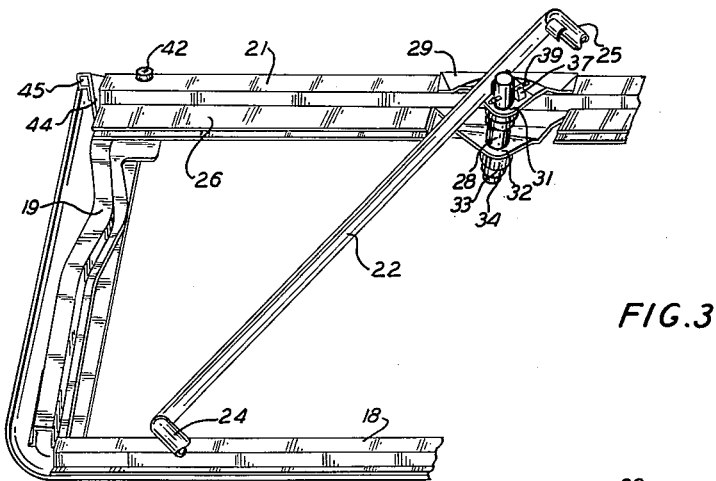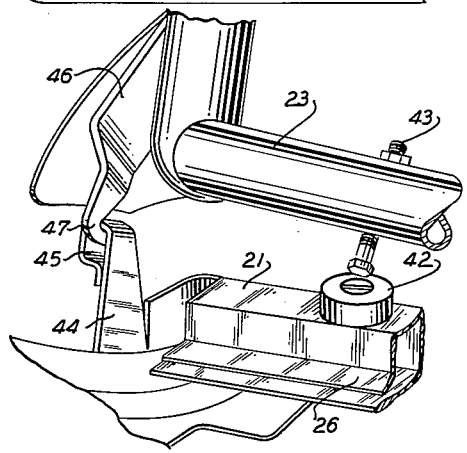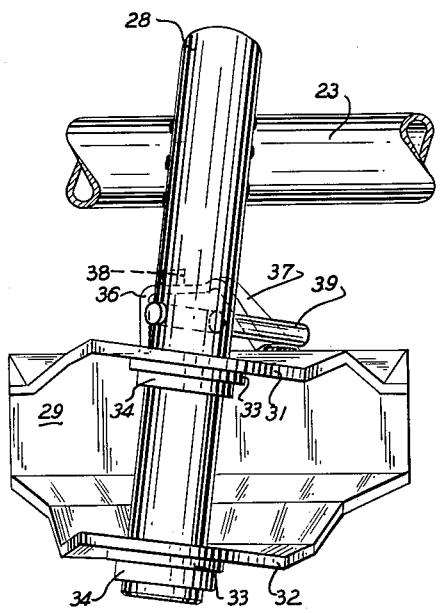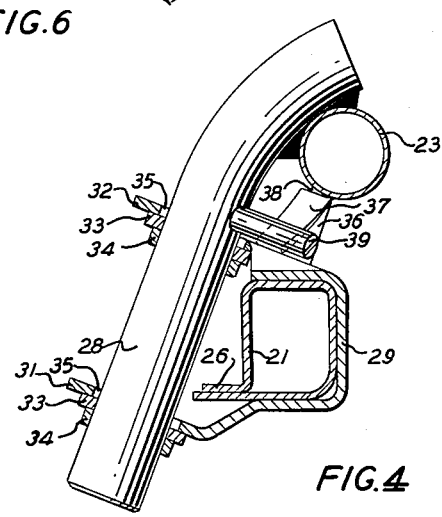

United States Patent Office 3,054,641
Patented Sept. 18, 1962

3,054,641
PIVOTED SEAT BACK
Raymond P. Smith, Huntington Woods, Mich., assignor to Ford Motor Company, Dearborn, Mich., a corporation of Delaware
Filed Jan. 14, 1960, Ser. No. 2,385
2 Claims. (Cl. 297—383)

This invention relates generally to automobile seat construction and refers particularly to a pivoted front seat back.

Conventional two door sedans are provided with a split-back front seat construction in which each half of the seat back is hinged to the rear edge of the front seat frame by inner and outer hinge members to swing forwardly and inwardly around an axis which extends rearwardly and upwardly toward the longitudinally center line of the vehicle body. The purpose of this construction and arrangement is to provide easier ingress and egress to or from the rear seat. One disadvantage of the conventional structure is that as the seat is swung forwardly and inwardly it also acquires a downward component of movement. Frequently, packages, hats or othere objects left on the seat cushion are crushed between the seat back and seat cushion. Should the seat back be pushed forwardly with a person occupying the seat, a somewhat contorted movement is required on the part of the seat occupant to permit the seat back to be swung inwardly far enough to provide sufficient entrance or exit room to the rear seating area.

It is an object of the present invention to provide an improved construction and arrangement in which the split seat back is swingable forwardly and inwardly about a single, substantially upstanding axis. Also, suitable means are provided to raise the seat back as it swings inwardly so that the bottom surface thereof will clear the crown of the seat cushion.

Other objects and advantages of the present invention will be made more apparent as this description proceeds, particularly when considered in connection with the accompanying drawings, wherein:

FIG. 3 is a fragmentary view illustrating the seat back in its forward position of adjustment relative to the seat frame;

FIG. 4 is an enlarged sectional view taken substantially on the line 4—4 of FIG. 2 looking in the direction of the arrows;

FIG. 5 is an enlarged front elevational fragmentary view of the pivot structure supporting the seat back on the seat cushion frame; and FIG. 6 is an enlarged perspective view taken within the circle 6 of FIG. 2.

Figure 1:
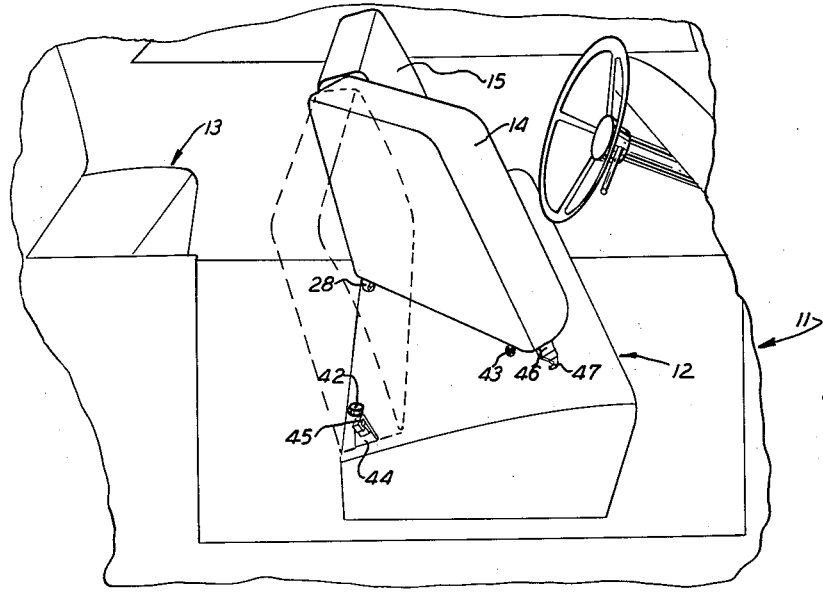
FIG. 1 is a diagrammatic perspective view showing the seat construction embodying the present invention related to the passenger compartment of a vehicle body.

Referring now more particularly to the drawings, it will be noted that FIG. 1 illustrates a portion of a vehicle body generally designated 11 having a front seat 12 and a rear seat 13. The vehicle body is of the type known as a coupe or two door sedan, that is, only one door is provided on each side for access to both the front and rear seating areas. In order to permit easier access to the rear seating area, provision is made for swinging the front seat back inwardly from its FIG. 1 dot-dash outline position to its solid outline position. The front seat back structure illustrated is of the split-back type in which the back cushion comprises two units, designated 14 and 15.

Figure 2:
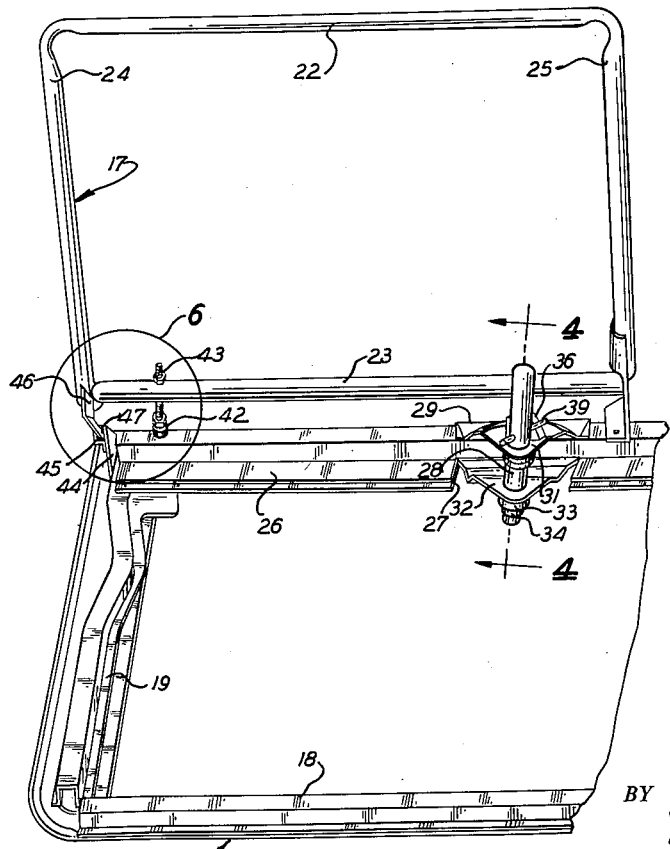
FIG. 2 is a perspective view of a fragmentary portion of the front seat structure with the cushions removed.

Referring now to FIG. 2, the construction and arrangement of the seat frame 16 of the front seat 12 and the seat back frame 17 of the seat back unit 14 are illustrated. The springs and cushioning material having been omitted to provide a clearer showing of the structure embodying the present invention. Inasmuch as the front passenger seat back unit 14 and the driver seat back unit 15 are symmetrical in construction throughout this specification only the unit 14 will be described in detail.

The seat frame 16 is of box channel construction and is provided with a front box channel section 18, a side box channel section 19 and a rear box channel section 21 welded or otherwise suitably secured together.

The seat back frame 17 is illustrated as being of tubular construction having upper and lower horizontally extending tubular members 22 and 23 joined at the sides by vertically extending tubular members 24 and 25. As illustrated the sections 22, 24 and 25 form an integral U-shaped member. The horizontal lower member 23 is welded or otherwise suitably secured to the tubular members 24 and 25 at their lower ends. It will be understood that the construction and arrangement of the seat frame 16 and the seat back frame 17 are only exemplary. The principles of the present invention are applicable to other types of structures.

It will be noted that the box channel section 21 of the seat frame 16 is provided with a flange 26 extending in a substantially forwardly horizontal direction. Adjacent the center of the seat frame 16, the flange 26 is cut away as at 27 to provide clearance for a tubular member 28 which is the pivot shaft about which the seat back frame 17 is pivotally swingable from the dot-dash to the solid outline position shown in FIG. 1 or from the position shown in FIG. 2 to the position shown in FIG. 3. The pivot shaft 28 is journaled for pivotal movement relative to the box channel section 21 on a substantially U-shaped bracket 29 which encompasses and is welded to the box channel section 21, as best seen in FIG. 4.

The bracket 29 is provided with two forwardly and upwardly extending spaced flanges 31 and 32, respectively. Each flange has welded or otherwise suitably secured to its underside a pair of bushing or collar elements 33 and 34 providing the journal for the shaft 28. The flanges are suitably apertured as at 35 to permit the shaft 28 to project through the bushings or collars 33 and 34. As best seen in FIGS. 4 and 5, each bracket 29 is provided at its rear upper surface, directly over the box channel section 21, with a cylindrical segment 36 having an inclined or cam surface 37. On its upper surface the cylindrical segment 36 is provided with a stop 38. Extending through the pivot shaft 28 is a pin or cam follower 39. The pin 39 has the function of maintaining the pivot shaft in a desired height position relative to the bracket 29 when in the normal rest position as shown in FIGS. 2 and 5. It will be readily apparent that when the shaft 28 is rotated in a counterclockwise direction as viewed in FIG. 5, the pin 39 will ride up the inclined cam surface 37 of the cylindrical segment 36 causing the pivot shaft to be raised slightly. As the pivot shaft is raised it will raise the seat back frame 17. As best seen in FIG. 4, the pivot shaft 29 is curved slightly up at its upper extremity to provide increased contact area with the tubular member 22 and is welded or otherwise securely fastened to the latter.

As seen in FIG. 4, the pivot shaft 28 is canted slightly to the rear and, as seen in FIG. 5, it is illustrated as also being slightly inwardly canted. The slightly tilted axis about which the pivot shaft 28 rotates, coupled with the lift movement achieved through the pin and cam coaction causes the seat back 14 to be raised as the seat is swung from its dot and dash position illustrated in FIG. 1 to the solid outline position. The degree of upward movement is such that the lower bottom surface of the seat back 14 will ride over the crowned portion 41 of the front seat cushion 12. If this upward movement were not provided, the rubbing action of the bottom seat back would wear the surface of the seat cushion.

Referring now particularly to FIG. 6, there are illustrated a means for vertically supporting the outboard end of the seat in its normal operative position and a stop device for limiting the reverse swinging movement of the seat back frame as it is moved back from its solid outlined position to the dot and dash outline position shown in FIG. 1. The stop device also functions to provide resistance against rearward dislodgement of the seat back 14 by the weight of a person occupying the passenger seat. The seat back support means comprises a button 42 bolted or otherwise secured to the top surface of the box channel section 21 and an adjusting screw 43 threaded through the tubular member 22 of the seat back frame 17.

The stop device for limiting rearward movement of the seat back frame 17 comprises an arm 44 welded or otherwise secured to the lower seat frame structure 16 at the left rear corner, as viewed in FIG. 2. The arm 44 is provided with a forwardly facing opening 45 obtained by forming the end of the arm 44 into a box channel section. At its lower left hand corner as viewed in FIG. 2 the seat back structure 17 is provided with a downwardly depending arm 46 having a hook portion 47 at the lower extremity thereof. As the seat is swung from its solid outline position shown in FIG. 1 to the dot-dash outline position the hook portion 47 engages in the opening 45 effectively limiting further rearward movement of the seat.

In operation, when the vehicle seat is in the dot-dash outline position illustrated in FIG. 1, the application of forward pressure to the upper right-hand corner of the seat back unit 14 results in the seat back being swung forwardly. The swinging movement is inwardly toward the center of the vehicle. Because of the pin and cam structure at the pivot axis, the seat will be raised slightly as it swings inwardly. The upward movement is also influenced to some extent by the angle of tilt of the pivot shaft 28. However, the seat does not swing or tilt inwardly toward the base or seat cushion 12 but maintains a substantially upstanding position. Thus, any objects which might be on the seat are merely swept toward the center of the seat and any person occupying the passenger seat would only have to move slightly inwardly toward the center of the vehicle to provide room for the swinging movement of the seat back unit 14. The objects or person sitting in the passenger seat would not be crushed between the seat back and the seat cushion.

It will be noted that the seat back unit 14 has a conventional slight rearward tilt. Upon the release of the force tending to swing the seat back inwardly, the seat will tend to drop back to its normal position, that is, the dot-dash outline position shown in FIG. 1.

It has been found that a seat back pivotally mounted in accordance with the present invention does not have the tendency to swing forwardly and inwardly as readily as the conventional seat back structure which is swingable about an axis only slightly inclined from the horizontal. Deceleration forces acting on a conventionally pivoted seat back are generally such that the seat has a tendency to tip forwardly about its substantially horizontal tilt axis. In the present construction and arrangement, such tendency to tilt forwardly is resisted by the substantially upstanding pivot arm 28. Thus, it has not been found necessary to provide a positive locking arrangement between the hook 47 and the stop 44 although this could readily be done.

It will be understood that the invention is not to be limited to the exact construction shown and described, but that various changes and modifications may be made without departing from the spirit and scope of the invention, as defined in the appended claims.

I claim:
1. In a seat structure for a vehicle body, a seat frame provided with a structural member defining its rear edge, said member extending in a substantially horizontal direction laterally of said vehicle body and extending substantially the width of said vehicle body, a seat back frame, and hinge means pivotally mounting said seat back frame on said structural member at substantially the middle of the latter, said hinge means being constructed and arranged to provide for swinging movement of the seat back frame over said seat frame, the pivot axis of said hinge means extending in a direction effective to maintain said seat back frame in a substantially upstanding position as it swings over said seat frame, said hinge means including coacting elements effective to raise said seat back frame axially of said pivot axis relative to said seat frame as it swings over the latter.

2. In a vehicle seat structure for a vehicle body, a seat frame provided with a structural member defining its rear edge, said member extending in a substantially horizontal direction laterally of said vehicle body, a seat back frame, hinge means pivotally mounting said seat back frame adjacent its inner edge on said structural member, said hinge means being constructed and arranged to provide for swinging movement of said seat back frame over said seat frame, said hinge means being further constructed and arranged to raise said seat back frame relative to said seat frame as it swings over the latter, the pivot axis of said hinge means extending in a substantially up and down direction to maintain said seat back frame in a substantially upstanding position as it swings over said seat frame, said seat back frame and said seat frame having coacting means at their outer edges providing a stop limiting rearward movement of said seat back frame relative to said seat frame, and adjustable means interposed between said seat back frame and said seat frame at their outer edges providing vertical support for said seat back frame upon said seat frame.

References Cited in the file of this patent
UNITED STATES PATENTS

| | | |
|---|---|---|
| 325,897 | Alexander | Sept. 8, 1885 |
| 2,288,535 | Marx | June 30, 1942 |
| 2,604,653 | Anderson et al. | July 29, 1952 |
| 2,627,894 | Herider | Feb. 10, 1953 |